US006533447B2

(12) United States Patent
Koide et al.

(10) Patent No.: US 6,533,447 B2
(45) Date of Patent: *Mar. 18, 2003

(54) PLASTICIZING APPARATUS FOR A PRE-PLASTICIZATION-TYPE INJECTION MOLDING MACHINE

(75) Inventors: Atsushi Koide, Nagano (JP); Jun Nakazawa, Nagano (JP)

(73) Assignee: Nissei Plastic Industrial Co. Ltd., Nagano-Ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/417,117

(22) Filed: Oct. 13, 1999

(65) Prior Publication Data

US 2002/0006076 A1 Jan. 17, 2002

(30) Foreign Application Priority Data

Oct. 20, 1998 (JP) .......................................... 10-298080
Sep. 14, 1999 (JP) .......................................... 11-261167

(51) Int. Cl.[7] ............................................... B29C 45/54
(52) U.S. Cl. .......................... 366/78; 366/100; 425/562
(58) Field of Search ........................... 366/77, 78, 100, 366/79, 289, 76.3, 76.4, 80; 425/145, 557, 558, 561, 587, 562, 563, 382.4, 207–209

(56) References Cited

U.S. PATENT DOCUMENTS 3,020,591 A * 2/1962 Breher et al.
3,263,276 A * 8/1966 Maier
3,274,648 A * 9/1966 van Orman
3,611,503 A * 10/1971 Blumer
3,728,058 A * 4/1973 Stillhard et al.
4,447,156 A * 5/1984 Csongor
4,540,359 A * 9/1985 Yamazaki
4,749,279 A * 6/1988 Csongor
5,421,712 A * 6/1995 Laing et al.
5,770,245 A * 6/1998 Takizawa et al.
5,955,117 A * 9/1999 Ito et al.
6,042,362 A * 3/2000 Mitsui
6,283,197 B1 * 9/2001 Kono

FOREIGN PATENT DOCUMENTS

JP A825437 1/1996

* cited by examiner

*Primary Examiner*—Charles E. Cooley
*Assistant Examiner*—David Sorkin
(74) *Attorney, Agent, or Firm*—Birch, Stewart, Kolasch & Birch, LLP

(57) ABSTRACT

A plasticizing apparatus used for a pre-plasticization-type injection molding machine is equipped with a screw drive section which comprises a rotational drive section supported in an axially moveable manner and adapted to rotate the screw; and an advancement/retraction drive section including a servomotor and a ball-screw mechanism for converting rotational motion of the servomotor to linear motion in order to axially move the rotational drive section. By virtue of the above-described structure, the screw disposed within the barrel is rotated by the rotational drive section of the screw drive section, so that the molding material within the barrel is plasticized (melted) and is then supplied to the injection apparatus. Further, the rotational drive section (screw) is advanced and retracted by the advancement/retraction section of the screw drive section, so that the resin passage of the barrel is opened and closed in accordance with the position of the screw.

4 Claims, 7 Drawing Sheets

PLASTICIZING APPARATUS FOR A PRE-PLASTICIZATION-TYPE INJECTION MOLDING MACHINE

BACKGROUND OF THE INVENTION

1. Field of the Invention

The present invention relates to a plasticizing apparatus used for a pre-plasticization-type injection molding machine in order to plasticize and melt a molding material and to supply the melted material to an injection apparatus.

2. Description of the Related Art

Conventionally, a so-called pre-plasticization-type injection molding machine is known (see Japanese Patent Application Laid-Open (kokai) No. 8(1996)-25437. Such an injection molding machine includes a plasticizing apparatus for plasticizing and melting a molding material, and an injection apparatus for injecting and charging melted resin into a mold.

In such a pre-plasticization-type injection molding machine, a molding material is supplied from a hopper to the interior of a barrel of the plasticizing apparatus, and the molding material is plasticized (melted) by rotation of a screw disposed within the barrel. The thus-melted resin is discharged from a resin exit provided at the tip end of the barrel to be fed, via a resin passage portion, to the interior of the tip end portion of an injection cylinder of the injection apparatus. The thus-fed resin is measured and accumulated within the injection cylinder. During measurement, an injection plunger of the injection cylinder retracts. After completion of measurement, the injection plunger is advanced in order to inject and charge the resin into a cavity of a mold.

The pre-plasticization-type injection molding machine involves a problem in that during injection, the measured resin flows backward via the resin passage portion to the interior of the barrel. Therefore, a valve section is added to the resin passage portion in order to open and close the resin passage. During measurement, the valve section is opened in order to allow passage of resin, and during injection, the valve section is closed in order to shut off the resin passage, thereby preventing backflow of the resin at the resin passage portion.

However, such a conventional pre-plasticization-type injection molding machine has the following drawbacks to be solved.

First, since only a valve of a limited type can be used for the valve section, the valve section cannot be opened and closed instantaneously (within a short period of time), resulting in the occurrence of lost time in relation to the opening and closing operations of the valve section. Therefore, molding cycle time cannot be shortened, and productivity cannot be improved.

Second, a valve section is added to the resin passage portion, and a drive section for opening and closing the valve section is provided. Therefore, the resin passage portion must be formed to have a special internal structure and shape. This results in a complex structure of the resin passage portion, decreased reliability, and increased cost.

SUMMARY OF THE INVENTION

An object of the present invention is to provide a plasticizing apparatus used for a pre-plasticization-type injection molding machine which can open and close a resin passage instantaneously (within a short period of time) to thereby shorten molding cycle time and improve productivity.

Another object of the present invention is to provide a plasticizing apparatus used for a pre-plasticization-type injection molding machine which can simplify the structure of the resin passage portion to thereby improve reliability, while decreasing overall cost of the pre-plasticization-type injection molding machine.

To achieve the above-described objects, the present invention provides a plasticizing apparatus used for a pre-plasticization-type injection molding machine in which a molding material is plasticized/melted by rotation of a screw disposed within a barrel and is then supplied to an injection apparatus; and a screw drive section is provided in order to open and close a resin passage of the barrel by axial displacement of the screw. The plasticizing apparatus is characterized in that the screw drive section comprises a rotational drive section supported in an axially moveable manner and adapted to rotate the screw; and an advancement/retraction drive section including a servomotor and a ball-screw mechanism for converting rotational motion of the servomotor to linear motion in order to axially move the rotational drive section.

By virtue of the above-described structure, the screw disposed within the barrel is rotated by the rotational drive section of the screw drive section, so that the molding material within the barrel is plasticized (melted) and is then supplied to the injection apparatus. Further, the rotational drive section (screw) is advanced and retracted by the advancement/retraction section of the screw drive section, so that the resin passage of the barrel is opened and closed in accordance with the position of the screw.

DETAILED DESCRIPTION OF THE PREFERRED EMBODIMENTS

Embodiments of the present invention will now be described in detail with reference to the drawings. The accompanying drawings are illustrative of the embodiments and are not meant to limit the scope of the invention. For clarification of the invention, detailed description of known parts is omitted.

Figure 3:
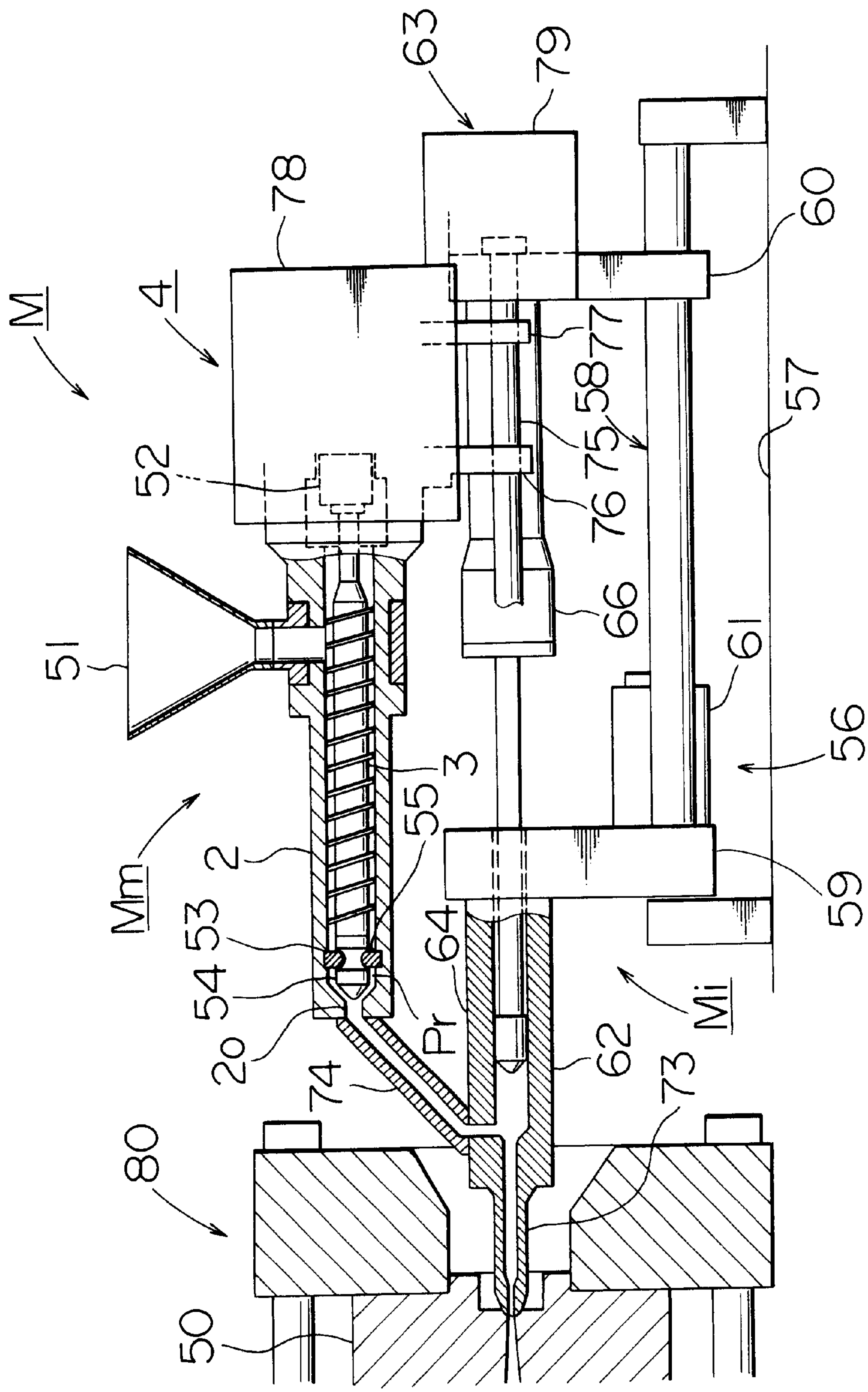
FIG. 3 is a partially sectioned side view of a pre-plasticization-type injection molding machine equipped with the plasticizing apparatus of FIG. 1.

First, the structure of a pre-plasticization-type injection molding machine M equipped with a plasticizing apparatus Mm according to the present embodiment will be described with reference to FIG. 3.

The pre-plasticization-type injection molding machine M has, as independent units, a plasticizing apparatus Mm for plasticizing and melting a molding material, and an injection apparatus Mi for injecting and charging melted resin into a mold 50.

The plasticizing apparatus Mm includes a barrel 2, which contains a screw 3 and has a hopper 51 at the rear portion thereof. Further, a screw drive section 4—which is a main portion of the present invention—is provided at the rear end of the barrel 2.

Meanwhile, a circumferentially extending annular groove 53 is formed at the front end portion of the screw 3, and a valve portion 54 is provided at the front side of the groove 53. Further, an annular valve seat member 55 is fixed within the barrel 2 such that the valve seat member 55 extends from the inner cylindrical surface of the barrel 2 to enter the annular groove 53. When the screw 3 is moved rearward until the valve portion 54 abuts the valve seat member 55, a resin passage Pr within the barrel 2 is shut off. When the screw 3 is advanced from that position by a few millimeters, the valve portion 54 separates from the valve seat member 55, so that the resin passage Pr is opened.

The injection apparatus Mi is supported by a molding machine moving apparatus 56. The molding machine moving apparatus 56 includes a tie-bar mechanism 58 disposed on the top surface of a machine base 57, and front and rear support plates 59 and 60 supported on the tie-bar mechanism 58 to be movable in the front/rear direction. The support plates 59 and 60 are advanced and retracted by a drive mechanism 61. The injection apparatus Mi has an injection cylinder 62 and a plunger drive section 63. The injection cylinder 62 is attached to the front surface of the front support plate 59 and projects forward. The plunger drive section 63 is attached to the rear support plate 60. An injection plunger 64 is inserted into the injection cylinder 62, and the rear end of the injection plunger 64 is coupled to the plunger drive section 63. The plunger drive section 63 includes a servomotor 65 (FIG. 2) for plunger drive; a ball-screw mechanism 66 for converting rotational motion output from the servomotor 65 to linear motion in order to move the injection plunger 64 in the front/rear direction; and a rotation transmission mechanism 67 disposed between the servomotor 65 and the ball-screw mechanism 66. The rotation transmission mechanism 67 comprises a drive pulley 69 attached to a motor shaft 68 of the servomotor 65, a driven pulley 71 attached to a rotation input shaft 70 of the ball-screw mechanism 66, and an endless timing belt 72 wound around and extended between the drive pulley 69 and the driven pulley 71. Instead of the ball-screw mechanism 66, another type of mechanism having the same function, such as a roller screw mechanism or an air drive mechanism, may be used for moving the injection plunger 64 in the front/rear direction.

Figure 1:
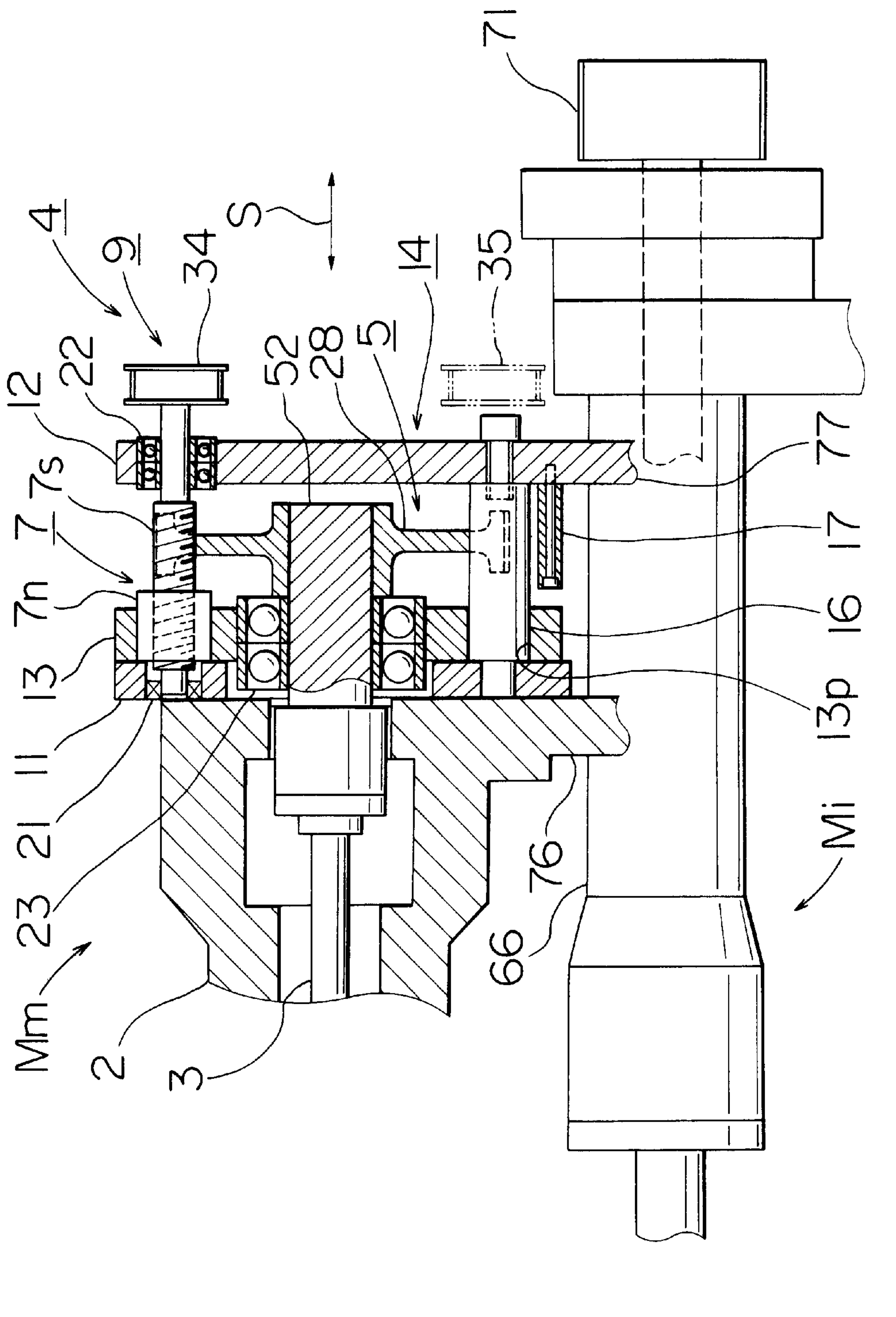
FIG. 1 is a sectional side view of a screw drive section provided in a plasticizing apparatus according to an embodiment of the present invention.

The injection cylinder 62 has an injection nozzle 73 at its front end. The front end portion of the interior of the injection cylinder 62 is connected to the resin exit 20 of the barrel 2 of the plasticizing apparatus Mm via an inclined pipe-shaped resin passage portion 74. Further, left and right support shafts 75 are provided between the support plates 59 and 60 so as to support a rear portion of the plasticizing apparatus Mm. Specifically, as shown in FIG. 1, left and right leg portions 76 are provided at the rear end of the barrel 2 such that the leg portions 76 extend downward, and the lower ends of the leg portions 76 are fixed to the support shafts 75 to thereby support the barrel 2. Similarly, left and right leg portions 77 are provided on a rear support plate 12 of the screw drive section 4, which will be described later, such that the leg portions 77 extend downward, and the lower ends of the leg portions 77 are fixed to the support shafts 75 to thereby support the screw drive section 4. Reference numerals 78 and 79 denote covers covering the screw drive section 4 and the plunger drive section 63, respectively, and reference numeral 80 denotes a mold clamping apparatus which supports the mold 50.

Next, the structure of the screw drive section 4 provided in the plasticizing apparatus according to the present embodiment will be described with reference to FIGS. 1 and 2.

The screw drive section 4 comprises a drive-section support mechanism 14 provided at the rear end of the barrel 2. The drive-section support mechanism 14 includes a front support plate 11 and the rear support plate 12, which are separated from each other in the axial direction S, and the front support plate 11 is fixed to the rear end of the barrel 2 and has a rectangular shape. Screw portions 7*s* and 8*s* of a pair of ball-screw mechanisms 7 and 8 are disposed to extend between the front support plate 11 and the rear support plate 12, and a pair of guide shafts 15 and 16 are also disposed to extend between the front support plate 11 and the rear support plate 12. Specifically, the screw portions 7*s* and 8*s* are disposed at symmetrical positions with respect to the screw 3; more specifically, at opposite ends of a diagonal of the front support plate 11 , and the guide shafts 15 and 16 are disposed at symmetrical positions with respect to the screw 3: more specifically, at opposite ends of the other diagonal of the front support plate 11. The screw portions 7*s* and 8*s* are rotatably supported by the front support plate 11 and the rear support plate 12 via bearings 21 and 22, and the shaft portions of the screw portions 7*s* and 8*s* are projected rearward from the rear support plate 12.

Further, a movable support plate 13 of the rotational drive section 5 is disposed between the front support plate 11 and the rear support plate 12, and nut portions 7*n* and 8*n* of the ball-screw mechanism 7 and 8 are fixed to the movable support plate 13. In FIG. 1, only the nut portion 7*n* is shown. The movable support plate 13 has guide holes 13*p*, through which the guide shafts 15 and 16 pass, whereby the movable support plate 13 is guided by the guide shafts 15 and 16. A bearing 23 is attached to a center portion of the movable support plate 13 in order to rotatably support a drive shaft 52. The front end of the drive shaft 52 is connected to the rear end of the screw 3. A stopper 17 is fixed onto a surface of the rear support plate 12 facing the front support plate 11. The stopper 17 prevents uncontrolled rearward movement of the screw 3 to thereby secure safety and protect the screw 3. For uncontrolled forward movement, the front support plate 11 functions in the same manner as does the stopper 17.

Figure 2:
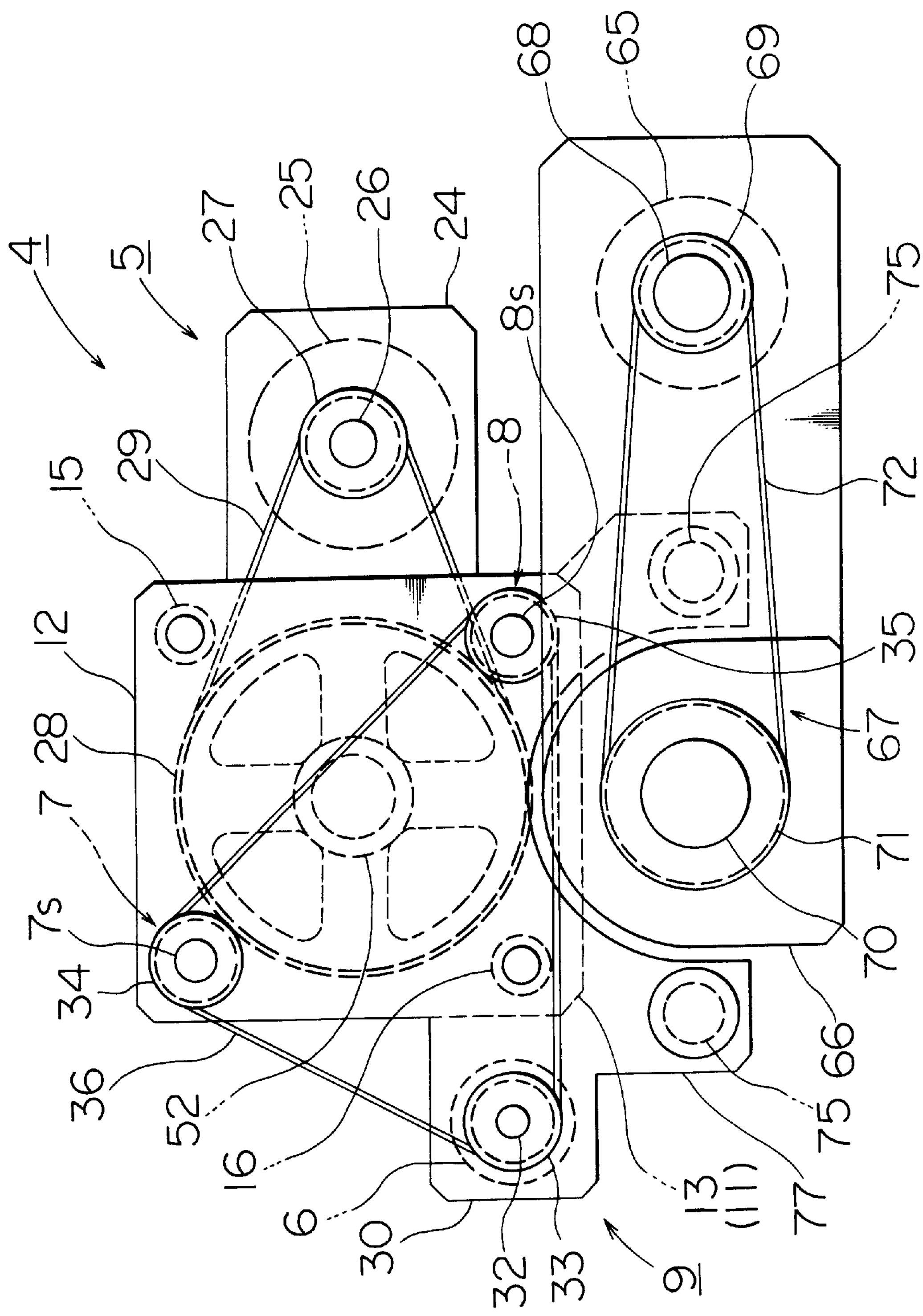
FIG. 2 is a rear view of the screw drive section of FIG. 1.

Further, as shown in FIG. 2, a motor support plate 24 is integrally provided on the right side-surface of the movable support plate 13. A servomotor 25 for screw rotation is attached to the motor support plate 24. A drive pulley 27 is attached to a motor shaft 26 of the servomotor 25; a driven pulley 28 is attached to a rear end portion of the drive shaft 52; and an endless timing belt 29 is wound around and extended between the drive pulley 27 and the driven pulley 28 to complete the rotational drive section 5.

Meanwhile, as shown in FIG. 2, a motor support plate 30 is integrally provided on the left side-surface of the rear support plate 12. A servomotor 6 for screw advancement/retraction is attached to the motor support plate 30. A drive pulley 33 is attached to a motor shaft 32 of the servomotor 6; driven pulleys 34 and 35 are respectively attached to rear ends of the shaft portions of the screw portions 7*s* and 8*s*; and an endless timing belt 36 is wound around and extended between the drive pulley 33 and the driven pulleys 34 and 35 to complete the advancement/retraction drive section 9.

Figure 4:
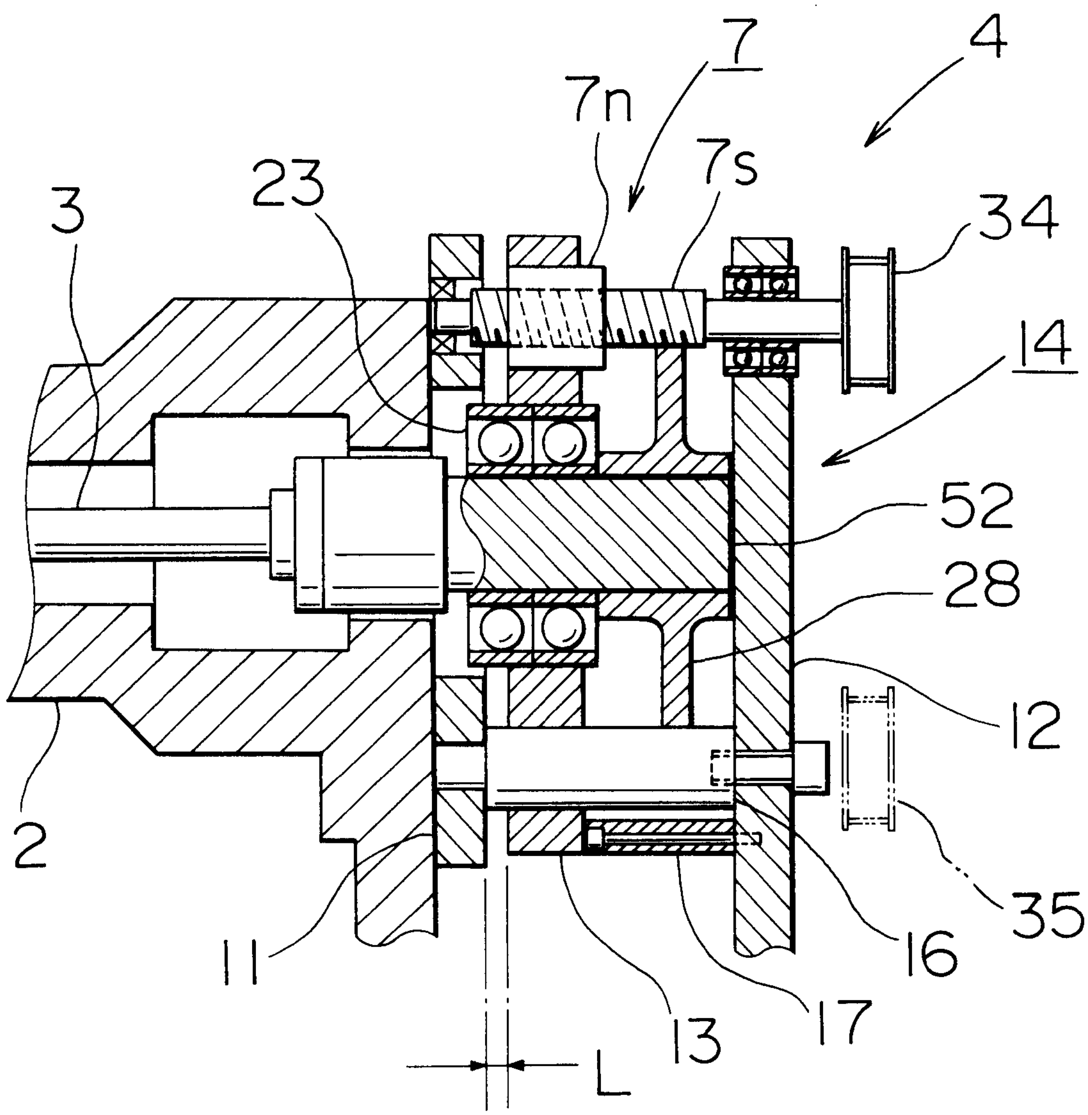
FIG. 4 is a sectional side view showing a state in which a movable support plate of the screw drive section is retracted.
Figure 5:
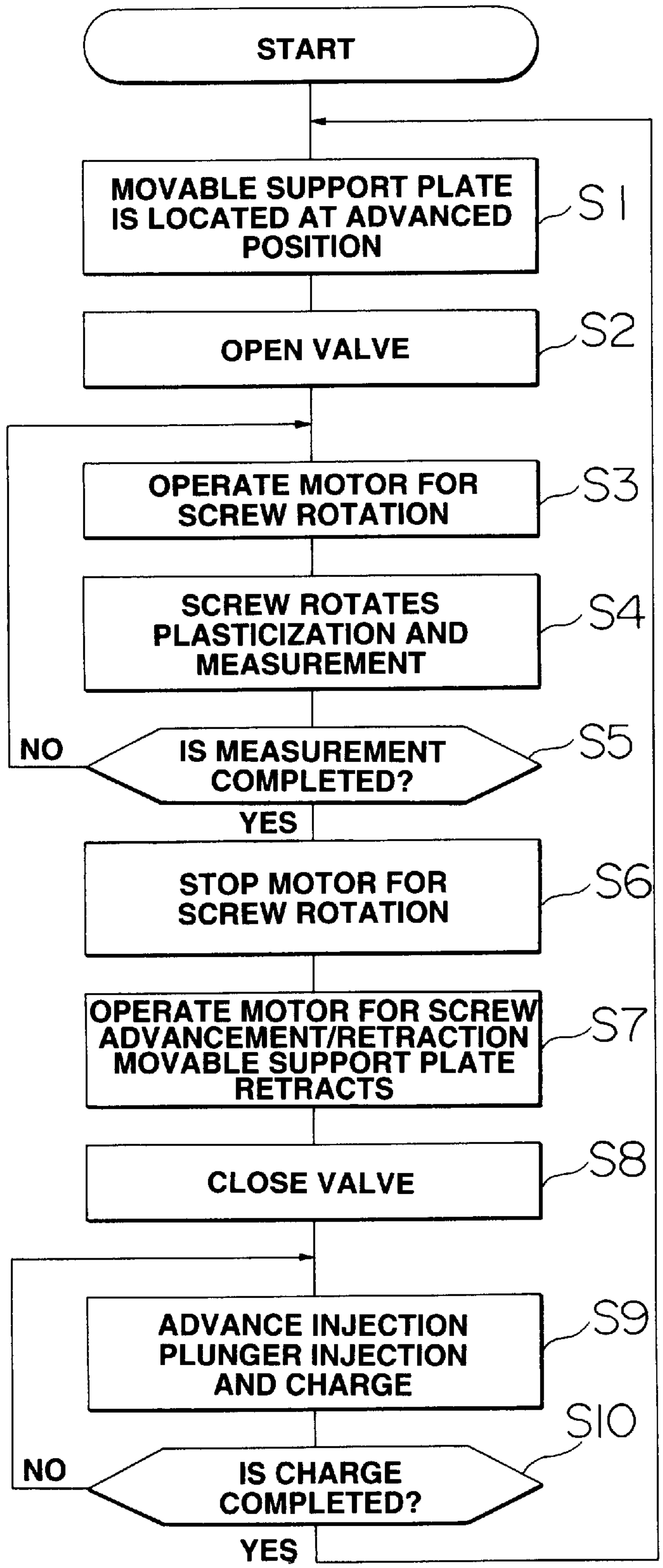
FIG. 5 is a flowchart showing the operation of the pre-plasticization-type injection molding machine.

Next, the operation of the pre-plasticization-type injection molding machine M, including the operation of the plasticizing apparatus Mm, will be described in accordance with the flowchart shown in FIG. 5 and with reference to FIGS. 1–4.

At the beginning of measurement, the movable support plate 13 is located at an advanced position shown in FIG. 1 (step S1). Therefore, the screw 3 is also located at an advanced position, so that the valve portion 54 separates from the valve seat member 55 in order to open the resin passage Pr (step S2). The screw 3 is positioned at the advanced position by means of position control effected by the servomotor 6.

Subsequently, the servomotor 25 for screw rotation is operated (step S3). As a result, the drive shaft 52 rotates, so that the screw 3 rotates at a preset speed. Meanwhile, a molding material is supplied from the hopper 51 to the interior of the barrel 2, and the thus-supplied molding material is plasticized (melted) through rotation of the screw 3. Further, the melted resin is discharged from the resin exit 20 of the barrel 2 and is fed, via the resin passage portion 74, to the front end side of the injection cylinder 62 of the injection apparatus Mi. The thus-fed resin is measured and accumulated within the injection cylinder 62 (step S4).

During measurement, the injection plunger 64 retracts. When the melted rain is accumulated in a preset amount by means of measurement, the servomotor 25 is stopped (steps SS and S6). Simultaneously, in response to a retraction command signal, the servomotor 6 for screw advancement/retraction is operated. As a result, the screw portions 7*s* and 8*n* of the ball-screw mechanisms 7 and 8 rotate, so that the movable support plate 13 retracts (step S7). As a result, the screw 3 retracts to and stops at a position where the valve portion 54 abuts the valve seat member 55. Thus, the resin passage Pr is closed (step S8). FIG. 4 shows a state in which the movable support plate 13 has retracted by a stroke L from the advanced position shown in FIG. 3. The stroke of the screw 3 for closing the resin passage Pr is set through position control effected by the servomotor 6. The movable support plate 13 (rotational drive section 5) is moved smoothly in the axial direction S, while being stably supported by the paired ball-screw mechanisms 7 and 8 symmetrically disposed with respect to the screw 3 and the paired guide shafts 15 and 16 symmetrically disposed with respect to the screw 3 at positions different from those of the ball-screw mechanisms 7 and 8.

Subsequently, the injection apparatus Mi is driven and controlled. As a result, the injection plunger 64 advances in order to inject and charge the resin accumulated in the injection cylinder 62 into the cavity of the mold 50 (step S9). Upon completion of the injection, the servomotor 6 for screw advancement/retraction operates in response to an advancement command signal, so that the movable support plate 13 advances (step S7). As a result, the screw 3 advances, and the operation of servomotor 6 stops at a position where the movable support plate 13 abuts the front support plate 11. In this way, one molding cycle is completed, and subsequently the same operation is repeated.

Next, a screw drive section 4 according to a modified embodiment of the present invention will be described with reference to FIGS. 6 and 7.

Figure 6:
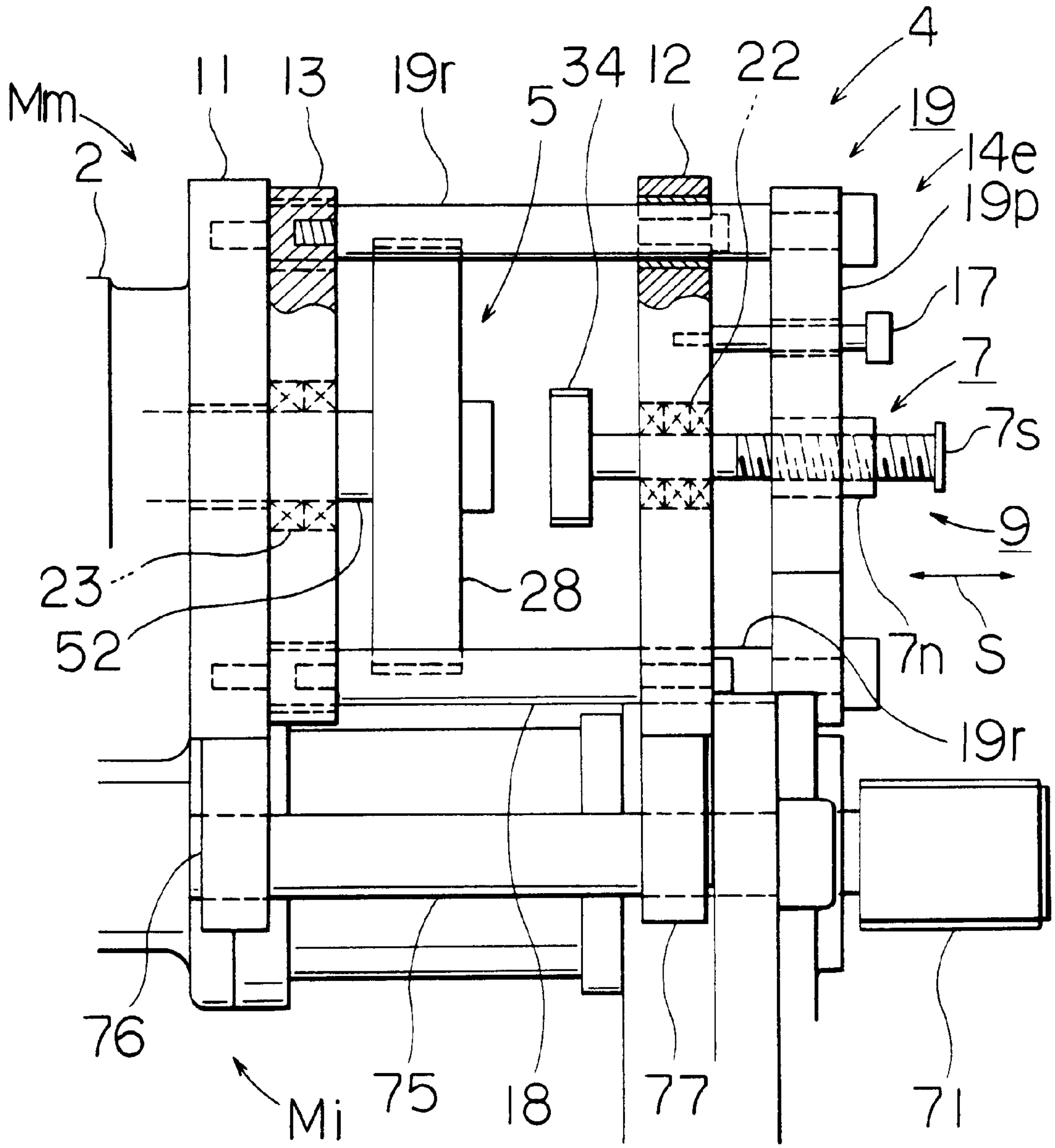
FIG. 6 is a sectional side view of a screw drive section provided in a plasticizing apparatus according to a modified embodiment of the present invention.
Figure 7:
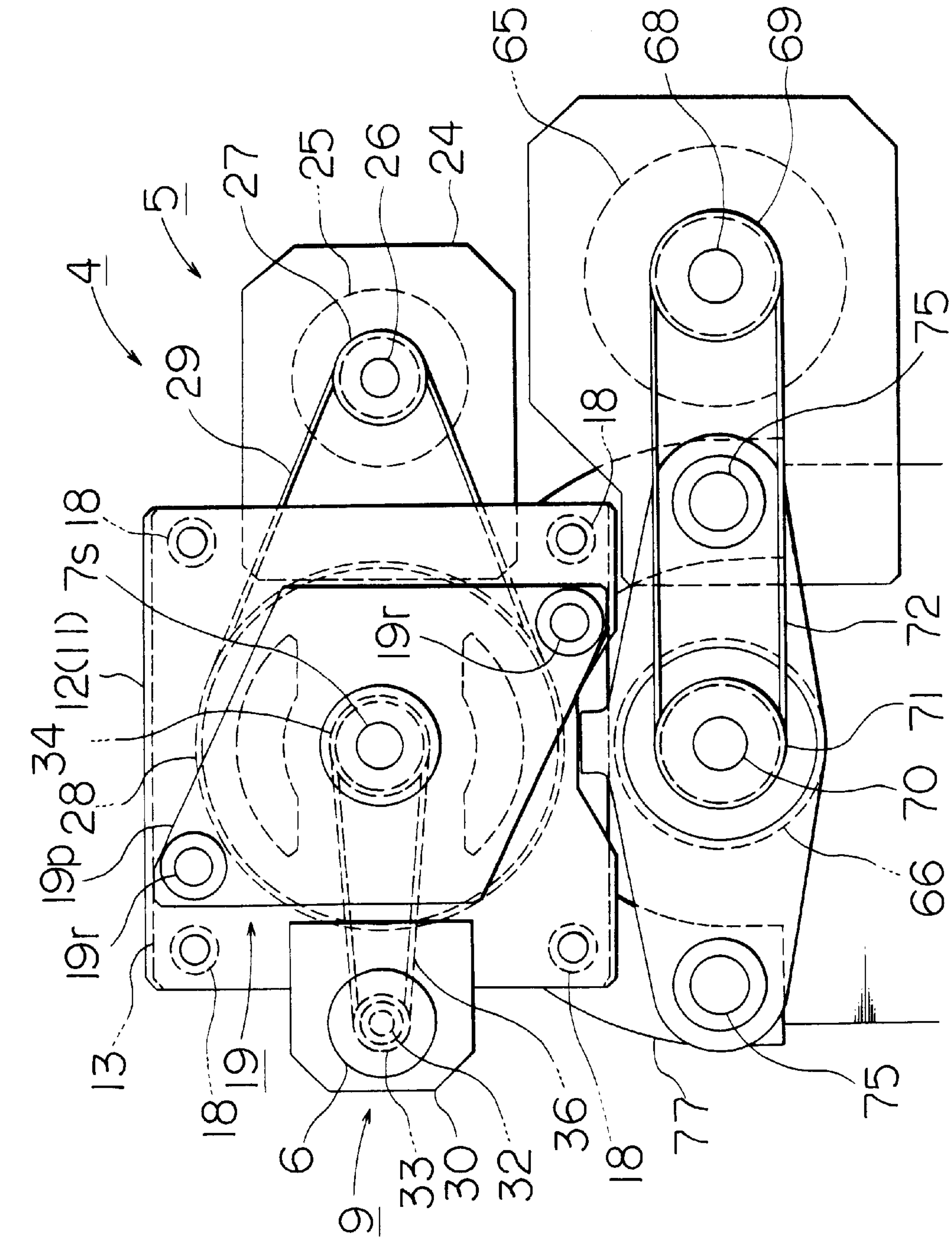
FIG. 7 is a rear view of the screw drive section of FIG. 6.

As shown in FIG. 6, in the screw drive section 4 according to the modified embodiment, the front support plate 11 and the rear support plate 12 are fixedly provided on the rear side of the barrel 2 such that they are separated from each other in the axial direction S. Further, as shown in FIG. 7, four guide shafts (upper-left shaft, upper-right shaft, lower-left shaft, and lower-right shaft) 18 are disposed to extend between the front support plate 11 and the rear support plate 12 in order to support the movable support plate 13 of the rotational drive section 5 such that the movable support plate 13 is movable in the axial direction S. The screw portion 7*s* of the ball-screw mechanism 7 is rotatably supported at the center of the rear support plate 12, and the nut portion 7*n* of the ball-screw mechanism 7 is coupled to the movable support plate 13 via a connection mechanism 19. In this case, the connection mechanism 19 has a nut fixation plate 19*p* and two connection rods 19*r*. The nut fixation plate 19*p* is disposed on the rear side of the rear support plate 12, and the nut portion 7*n* of the ball-screw mechanism 7 is fixed to the nut fixation plate 19*p*. The two connection rods 19*r* are arranged symmetrically with respect to the screw portion 7*s* such that the connection rods 19*r* penetrate the rear support plate 12 to connect the nut fixation plate 19*p* with the movable support plate 13. Thus, a drive-section support mechanism 14*e* is completed. The stopper 17 for restricting the displacement of the movable support plate 13 (the nut fixation plate 19*p*) is provided on the rear support plate 12. In FIGS. 6 and 7, portions identical to (portions having the same functions as) those in FIGS. 1–4 are denoted by the same reference numerals in order to clarify the structure, and their detailed descriptions will be omitted.

By virtue of the above-described structure, when the servomotor 6 operates and the screw portion 7*s* of the ball-screw mechanism 7 rotates accordingly, the nut fixation plate 19*p* advances and retracts, so that the movable support plate 13 is advanced and retracted via the connection mechanism 19. Therefore, the plasticizing apparatus according to the modified embodiment functions (operates) in substantially the same manner as does the plasticizing apparatus of the above-described embodiment shown in FIGS. 1–4.

As described above, in the plasticizing apparatus Mm according to each of the embodiments, since the resin passage Pr opens and closes through a small displacement of the screw 3, the resin passage Pr can be opened and closed instantaneously (within a short period of time). Accordingly, molding cycle time can be shortened and productivity can be improved. Further, unlike the case with conventional techniques, the resin passage portion 74 does not require a valve section of a conventional type and a drive section for opening and closing the valve section. Therefore, the structure of the resin passage portion 74 can be simplified to thereby improve reliability and reduce costs. In addition, use of the servomotor 6 secures increased torque and improved controllability, even when the stroke is short, as compared with the case where drive means of another type, such as an electromagnetic solenoid, is used.

The present invention is not limited to the above-described embodiments. Regarding structural details, shape, material, number of elements, method, and the like, modifications and any omission or addition may be possible as needed without departing from the scope of the invention. For example, in the embodiments, two screw drive portions 4 having different structures are described. However, no particular limitation is imposed on the structure, and the illustrated structures may be replaced with any other structure that provides the same function. Further, the term "ball-screw mechanism" encompasses not only an ordinary ball-screw mechanism but also a roller-screw mechanism and similar mechanisms providing the same function. Moreover, although in the embodiments the stopper 17 is provided on the rear support plate 12, a similar stopper may be provided on the front support plate 11.

What is claimed is:

1. A plasticizing apparatus for supplying flowable plastic material to an injection molding apparatus, the plasticizing apparatus comprising:

a barrel with an inner cylindrical surface, the barrel having a discharge opening at a forward end thereof for discharging flowable plastic material to the injection molding apparatus;

a screw disposed in the barrel for rotating movement about its axis and for axial movement toward and away from the discharge opening, the screw having an annular groove at an end thereof adjacent to the discharge opening;

a flow passage formed in the barrel between confronting surfaces of the barrel and the screw adjacent the discharge opening;

a first valve element carried by the screw for axial movement therewith, the first valve element comprising a wall of the annular groove;

a second valve element fixed within the barrel, the second valve element comprising an annular valve seat extending inwardly from the cylindrical surface of the barrel and received in the annular groove;

means for imparting rotational movement to the screw; and means for imparting axial movement to the screw (1) in a first direction to effect engagement of the valve elements and closing of the flow passage and (2) in a second direction to effect separation of the valve elements and opening of the flow passage.

2. The plasticizing apparatus as recited in claim 1, wherein the first direction is rearwardly away from the discharge opening.

3. The plasticizing apparatus as recited in claim 1, wherein the wall of the groove faces away from the discharge opening, whereby movement of the screw in the rearward direction away from the discharge opening effects engagement of the valve elements and closing of the flow passage.

4. The plasticizing apparatus as recited in claim 1, wherein:

the means for imparting rotational movement to the screw is supported for axial movement with the screw; and the means for imparting axial movement to the screw includes a ball-screw mechanism.

* * * * *